United States Patent [19]

Abend et al.

[11] Patent Number: 4,940,748
[45] Date of Patent: Jul. 10, 1990

[54] PLASTISOL MOLDING MATERIAL

[75] Inventors: Thomas Abend, St. Gallen; Max Lauchenauer, Arbon, both of Switzerland

[73] Assignee: EMS-Togo AG, Domat/Ems, Switzerland

[21] Appl. No.: 370,330

[22] Filed: Jun. 22, 1989

[30] Foreign Application Priority Data

Jun. 29, 1988 [DE] Fed. Rep. of Germany ....... 3821926

[51] Int. Cl.$^5$ .............................................. C08L 27/06
[52] U.S. Cl. ..................................... 524/521; 523/310; 521/28; 524/527; 525/192; 525/212; 525/221
[58] Field of Search ........................... 523/310; 521/28; 524/527, 521; 525/192, 212, 221

[56] References Cited

U.S. PATENT DOCUMENTS 2,891,014  6/1959  Tsunoda et al. ..................... 524/521
4,216,073  8/1980  Goldstein ........................... 204/296

*Primary Examiner*—Joseph L. Schofer
*Assistant Examiner*—John J. Guarriello
*Attorney, Agent, or Firm*—Bierman and Muserlian

[57] ABSTRACT

Plastisol molding compositions, especially those based on PVC polymers and/or copolymers, containing an acidic cation exchanger. Such compositions do not cause discoloration in use in comparison with conventional materials which lack the acidic cation exchanger.

21 Claims, No Drawings

PLASTISOL MOLDING MATERIAL

This Application claims the benefit of German Application No. 38 21 926.3, filed June 29, 1988.

This invention relates to a plastisol molding materials, especially those based upon PVC polymers and/or copolymers.

BACKGROUND OF THE INVENTION

Plastisol molding materials are used to a large extent in automobile construction for the bonding and sealing of joints and beaded flanges of automobile body work sheeting, both internally and externally. In particular, plastisols based on PVC polymers and/or copolymers are used for this purpose. It is known that such plastisol molding materials comprise fine polymer praticles dispersed in a liquid, non-volatile plasticizer. At ambient temperature, the solid polymer particles are insoluble in the plasticizer, but the plasticizer dissolves them at elevated temperatures, resulting in a homogeneous solution of the polymer in the plasticizer, which solidifies on cooling to a more or less rigid film.

The plastisol may contain additional components such as fillers, flow control agents, water-absorbing materials such as calcium oxide, stabilizers, pigments, and bond promoters. The purpose of the bond promoters is to cause a lasting bond between the surfaces of conventional work pieces such as oily steel, galvanised or tinned metal sheets, electrocoated metal sheets, etc. Examples of bond promoters for PVC plastisols are polyaminoamides, polyamines, reaction products of excess polyfunctional amines with monomeric or aligomeric bisphenol-A glycidyl ethers, blocked isocyanates, silanes, mixtures of urotropin with resorcinol, etc. and mixtures thereof.

In automobile constructions, plastisols, especially PVC plastisols, are applied either in the body shop to non-degreased crude metal sheets or, following electrocoating, to primed sheets. If plastisol is applied in the body shop, the gelling operation with subsequent hardening takes place in a pre-gelling furnace, prior to the application of the electrocoat, or in the baking furnace for the electrocoat. In the case of application on the electrocoat, the hardening of the plastisol takes place with the baking of the subsequently applied materials, i.e. fillers, primers, and/or a topcoat. In the majority of cases, where fillers or the topcoat are sprayed on, the lacquering is carried out over the previously applied plastisol, whether gelled or not.

It is frequently found that white and pastel shade coating lacquers yellow at those places at which they are applied to the plastisols. Such undesirable discoloration can occur regardless of whether the plastisols have been gelled before lacquering or the coating lacquer has been applied by the wet-on-wet method to the ungelled plastisol. The latter is the application of several layers without drying or baking in between. Discoloration is seldom visible immediately after baking of the coating lacquer and, in the majority of cases, the discoloration does not appear until after some weeks or months. Yellowing of this type has been observed especially when the sheet pretreatment has been changed from anodic to cathodic electrophoretic dip lacquering and the interior spaces of automobile bodies have not been provided with an intermediate lacquer coating.

OBJECT OF THE INVENTION

The object behind the present invention is to provide plastisol molding material which do not contribute to the above-described yellowing of coating lacquers.

SUMMARY OF THE INVENTION

The invention is based upon the surprising finding that plastisols, especially those based upon PVC polymers and/or copolymers, which contain acidic cation exchangers, do not give rise to the discoloration of applied coating lacquers. This is even true for white or pastel colors.

In view of the fact that the plastisol molding materials of this invention commonly contain considerable quantities of highly basic additives such as calcium oxide, barium, calcium carbonate, or metal soaps, it is surprising that the acidic cation exchangers are effective. Presumably, they act by binding the low molecular weight amines released during baking.

DETAILED DESCRIPTION OF THE INVENTION

For the purpose of this invention, any known, highly acidic cation exchangers may be considered, e.g. those obtained by polymerization or copolymerization of styrene, divinylbenzene, acrylic acid, or styrene-sulfonic acids; or by subsequent sulphonation of such polymers or copolymers (in this connection, see Roempps Chem. Lexikon, 7th Edition, pages 1616 and 1617).

Particularly suitable exchangers have proved to be the highly acidic cation exchange resins derived from polystyrene-sulfonic acids, which have an exchange capacity in the range of 0.5 to 10.0 mVal/g, preferably 1.0 to 5.0 mVal/g. The acid groups of these cation exchange resins should be present predominantly in the acidic, protonized form.

Preferably, the plastisols of this invention contain the acidic cation exchangers in an amount of 0.005% to 5.0% by weight, preferably 0.01% to 2.0% by weight. It is particularly desirable that the cation exchange resin be pulverized, having a particle size not greater than that of the PVC resin or the particulate additivies and fillers present.

The plastisol molding materials of this invention are produced by a thorough mixing of the acidic cation exchangers. Preferably, a paste of plastisol plasticizer, acidic cation exchange resin, and optionally, additivies such as fillers, pigments, water-absorbing substances, flow-control agents, and/or bond-promoting agents is produced and mixed into the plastisol molding material. Such a paste comprises, for example, 35% to 75% by weight of one or more plasticizers, 5% to 35% by weight of one or more highly acidic cation exchangers, and 10% to 50% by weight of one or more mineral fillers, the proportions totaling 100%. This paste is preferably mixed into the plastisol molding material in an amount of 0.1% to 15% by weight. Of course, it is also possible to introduce the acidic cation exchangers into the molding material in the form of a powder or a dispersion in a liquid carrier. The carrier may comprise plasticizer and/or solvent. The acidic cation exchangers may also be mixed into the plastisol molding materials alone or together with the pulverized additives.

The production of plastisols and the apparatus used for this purpose are known, for example, from Krekeler, Wick, Kunststoff-Handbuch (1963), Vol. II, part I, page 21 ff., W.A. Colomb, Verlag Stuttgart, and Becker, Braun Kunststoff-Handbuch (1986), Vol. II, parts 1 and 2, Hanser Verlag, Muenchen-Wien.

PVC plastisols, which are preferred according to this invention, contain the following constituents in the weight proportions stated, the amounts totaling 100% in all cases.

(a) 10% to 60% of a PVC homopolymer or copolymer which has been produced by emulsion polymerization, micro-suspension polymerization, suspension polymerization, solution polymerization, or mass polymerization;

(b) 20% to 50% of plasticizers which are esters of aliphatic or aromatic mono-, di-, or polycarboxylic acids with monofunctional or difunctional alcohols, chloroparaffins, and/or secondary plasticizers which are hydrocarbons, fatty acid esters, sulfonic acid esters or the like;

(c) 5% to 60% of mineral or organic fillers and pigments; and (d) functional additives, such as stabliizers, bond-promoters, flow-control agents, solvents, etc.

The following examples illustrate the invention. The polyaminoamide used is a reaction product of dimerized linseed oil fatty acids with an excess of diethylenetriamine, amine value 290 mg KOH/g, and is in the form of a 50% solution in diisononyl phthalate. All parts are by weight.

EXAMPLE 1

A pasty Plastisol "A" is produced by mixing

| Diisononyl phthalate | 28 parts |
|---|---|
| PVC emulsion polymer powder capable of forming a paste | 15 parts |
| Precipitated calcium carbonate | 21 parts |
| Ground, natural chalk | 29 parts |
| Pulverized burnt lime | 4 parts |
| Polyaminoamide solution | 1 part |
| Tribasic lead sulfate | 1 part |
| High-boiling aliphatic hydrocarbon solvent (bp. 200-250° C.) | 1 part |

The pulverized constituents and additives of the plastisol formulation are formed into a paste with the plasticizer in a cowles dissolver, and then ground in a triple roll mill.

Using the same constituents in the above proportions, a second Plastisol "B" is produced, which additionally contains 3 parts of a paste of a polystyrene/sulfonic acid powder comprising

| Diisononyl phthalate | 52 parts |
|---|---|
| Highly acidic cation exchanger in H-form based on polystyrene and comprising sulfonic acid groups, max. grain size of powder 32 μm, and having an exchange capacity of 4.4 mVal/g | 20 parts |
| Precipitated chalk | 28 parts |

Plastisols A and B are processed under the following conditions:

With a caulking gun, approximately 1 mm thick and 15 mm wide seams of Plastisols A and B are laid over the cut edge of an overlapping sheet of a flange seam of a passenger vehicle door and gelled for 30 minutes at 160° C. Before the application of the plastisols, the sheets are alkali-degreased, phosphated, and provided with a commercially available cataphoretic, electrocoat (Uniprime from Pittsburgh Plate Glass PPG). Immediately after application of the Plastisols, white top-coats are applied, the binder of each of which consists essentially of an acid-hardening system based on alkyd/melamine resin. The finally-lacquered assembly is then baked for 30 minutes at 130° C.

The seam using Plastisol B, which is according to this invention, exhibits a pure white color even after 2 months driving in hot and humid climates. Plastisol A (the prior art), without the admixture according to the present invention, exhibits a pronounced yellowish discoloration of the lacquered plastisol.

EXAMPLE 2

Plastisol C, a stone chipping protective coats, having teh composition set forth below, is produced and tested according to the method of Example 1 except as set forth herein.

| Mixture of $C_8$ dialkyl phthalates | 33 parts |
|---|---|
| Aliphatic hydrocarbons (bp 240° C.) | 5 parts |
| Polyaminoamide solution | 1 part |
| Zinc sulfide pigments | 3 parts |
| Calcium oxide powder | 5 parts |
| Mixture of PVC and copolymer powder capable of forming a paste | 27 parts |
| Mixture of ground and precipitated chalk | 26 parts |

Plastisol (D) was prepared having the composition of Plastisol C plus 3 parts of the acidic cation exchanger of Example 1. Plastisols C and D were applied to a coating thickness of 600 μm on sample metal sheets, then gelled for 40 minutes at 140° C., lacquered over with the top-coat, baked for 30 minutes at 130° C., and stored in a climatically controlled cabinet protected from the light, at a temperature of 40° C. and 100% relative humidity.

After only 5 to 10 days, yellowing of Plastisol C was observed. On the other hand, even after 3 weeks, Plastisol D (the present invention) exhibited no yellowing whatsoever.

What we claim is:

1. A molding composition comprising a plastisol based upon polyvinyl chloride polymers and/or copolymers, a plasticizer and an acidic cation exchanger.

2. The composition of claim 1 wherein said exchanger is highly acidic.

3. The composition of claim 1 wherein said exchanger is a reaction product of polymerization or copolymerization of at least one monomer taken from the class consisting of styrene, divinylbenzene, acrylic acid, styrene sulfonic acids, and mixtures thereof.

4. The composition of claim 3 wherein said reaction product is sulfonated after said polymerization or copolymerization.

5. The composition of claim 3 wherein said monomer comprises said styrene sulfonic acid.

6. The composition of claim 1 wherein said exchanger has an exchange capacity of 0.5 to 10.0 mVal/G.

7. The composition of claim 6 wherein said capacity is 1.0 to 5.0 mVal/g.

8. The composition of claim 2 wherein said exchanger is a polymerization of copolymerization product of styrnee sulfonic acid, has an exchange capacity of 0.5 to 10.0 mVal/g, and has acid groups which are prodominantly in protonized form.

9. The composition of claim 8 wherein said capacity is 1.0 to 5.0 mVal/g.

10. The composition of claim 1 wherein said exchanger is present in said composition in an amount of 0.005% to 5.0% by weight.

11. The composition of claim 10 wherein said amount is 0.01% to 2.0%.

12. The composition of claim 1 wherein said exchanger has a particle size not exceeding that of and solid additives present.

13. The composition of claim 1 wherein said composition comprises 35% to 75% by weight of at least one said plasticizer, 5% to 35% by weight of at least one said exchanger, 10% to 50% by weight of at least one mineral filler.

14. The composition of claim 1 which further comprises at least one of mineral or organic fillers, pigments, stabilizers, bond promoters, flow control agents, and solvents.

15. The composition of claim 1 wherein said PVC homopolymer or copolymer is the result of emulsion polymerization, micro-suspension polymerization, suspension polymerization, solution polymerization, or mass polymerization.

16. The composition of claim 1 further comprising 5% to 60% mineral fillers, organic fillers, and/or pigments.

17. The composition of claim 1 further comprising functional additives.

18. The composition of claim 1 wherein said exchanger comprises polystyrene having acid groups and an exchange capacity of 0.5 to 10.0 mVal/g.

19. The composition of claim 17 wherein said capacity is 1.0 to 5.0 mVal/g.

20. A method of manufacture of the composition of claim 1 comprising mixing said exchanger into said homopolymer and/or copolymer.

21. The method of claim 20 comprising blending said exchanger and said plasticizer after mixing, and mixing the mixture with said homopolymer and/or copolymer.

* * * * *